United States Patent [19]

Moehring et al.

[11] 3,834,160

[45] Sept. 10, 1974

[54] LIGHT-OFF TRANSIENT CONTROL FOR AN AUGMENTED GAS TURBINE ENGINE

[75] Inventors: John Theodore Moehring, Cincinnati, Ohio; Thomas Norman Totten, Sr., Burnthills, N.J.

[73] Assignee: General Electric Company, Lynn, Mass.

[22] Filed: Mar. 26, 1973

[21] Appl. No.: 344,871

[52] U.S. Cl............................. 60/243, 60/39.28 R
[51] Int. Cl............................................. F02k 3/10
[58] Field of Search............... 60/243, 241, 39.28 R

[56] References Cited
UNITED STATES PATENTS

| 2,984,970 | 5/1961 | Bertaux | 60/243 |
|---|---|---|---|
| 3,395,538 | 8/1968 | Borel | 60/243 |
| 3,587,231 | 6/1971 | Fisher | 60/39.28 R |
| 3,595,021 | 7/1971 | Tissier | 60/39.28 R |
| 3,611,717 | 10/1971 | Tissier | 60/39.28 |
| 3,738,107 | 6/1973 | Miller | 60/243 |

Primary Examiner—Clarence R. Gordon

[57] ABSTRACT

A light-off transient control is provided for an augmented gas turbine engine and indirectly controls the rate of fuel flow to a plurality of augmentor fuel injectors. This is accomplished by bypassing a portion of the fuel flow metered from an augmentor fuel control for a limited time during ignition of augmentation in order to achieve a smooth and uniform thrust increase when the engine power control lever is advanced into the augmentor region of operation. The light-off transient control provides for quick filling of the feedlines and manifolds leading to the augmentor fuel injectors and also permits non-augmented operation with the manifolds drained in order to prevent the fuel injectors from coking.

8 Claims, 7 Drawing Figures

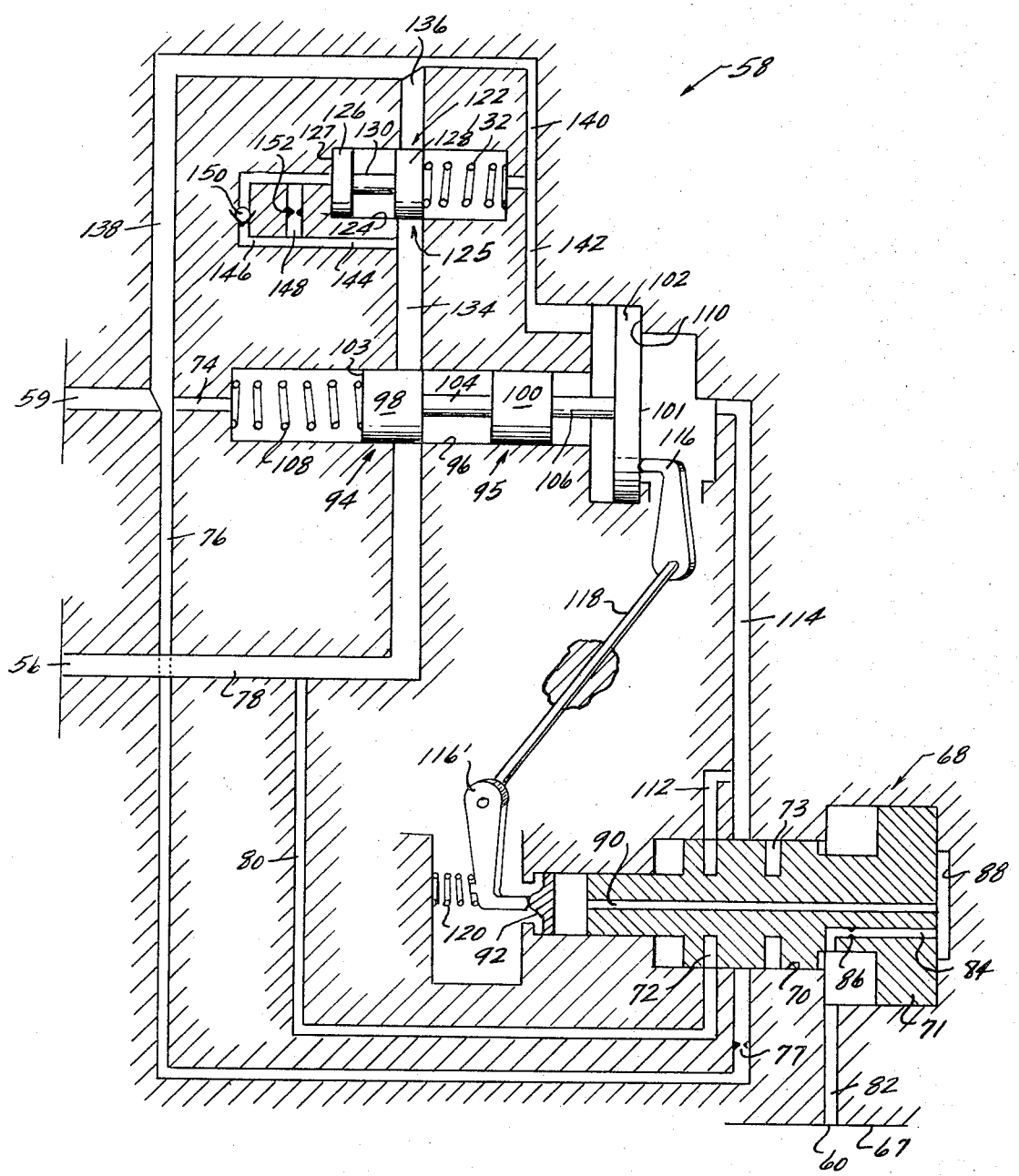

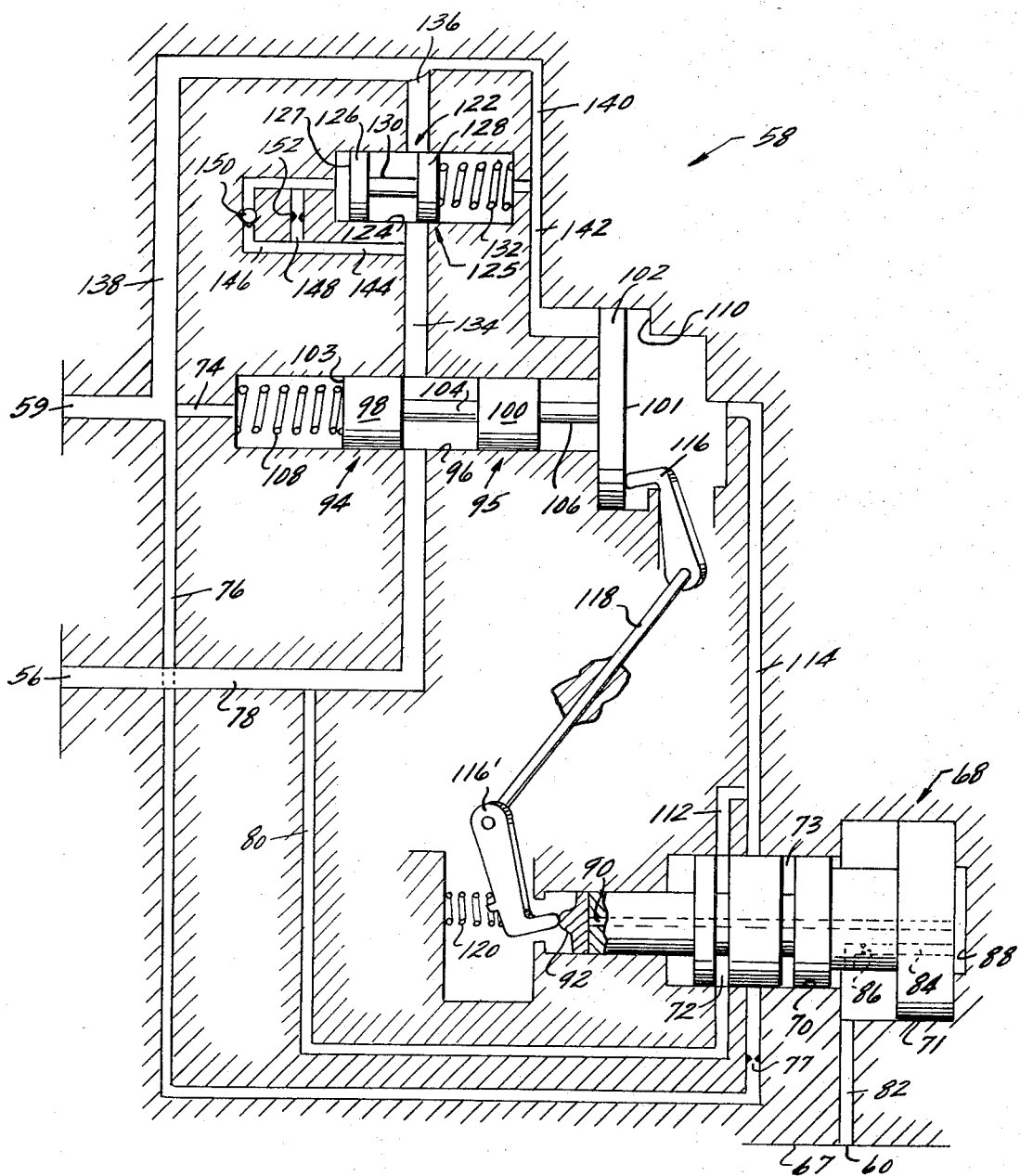

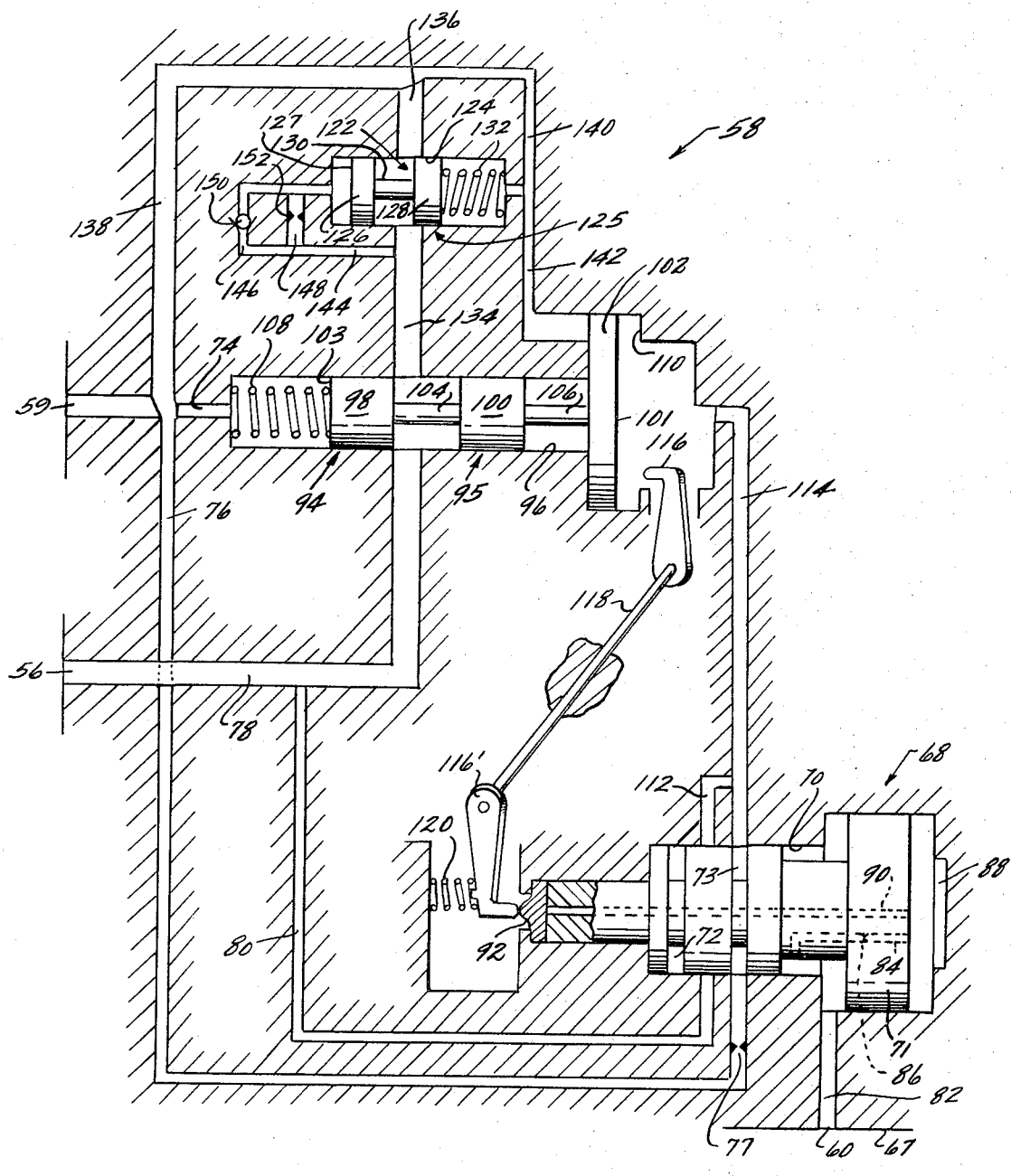

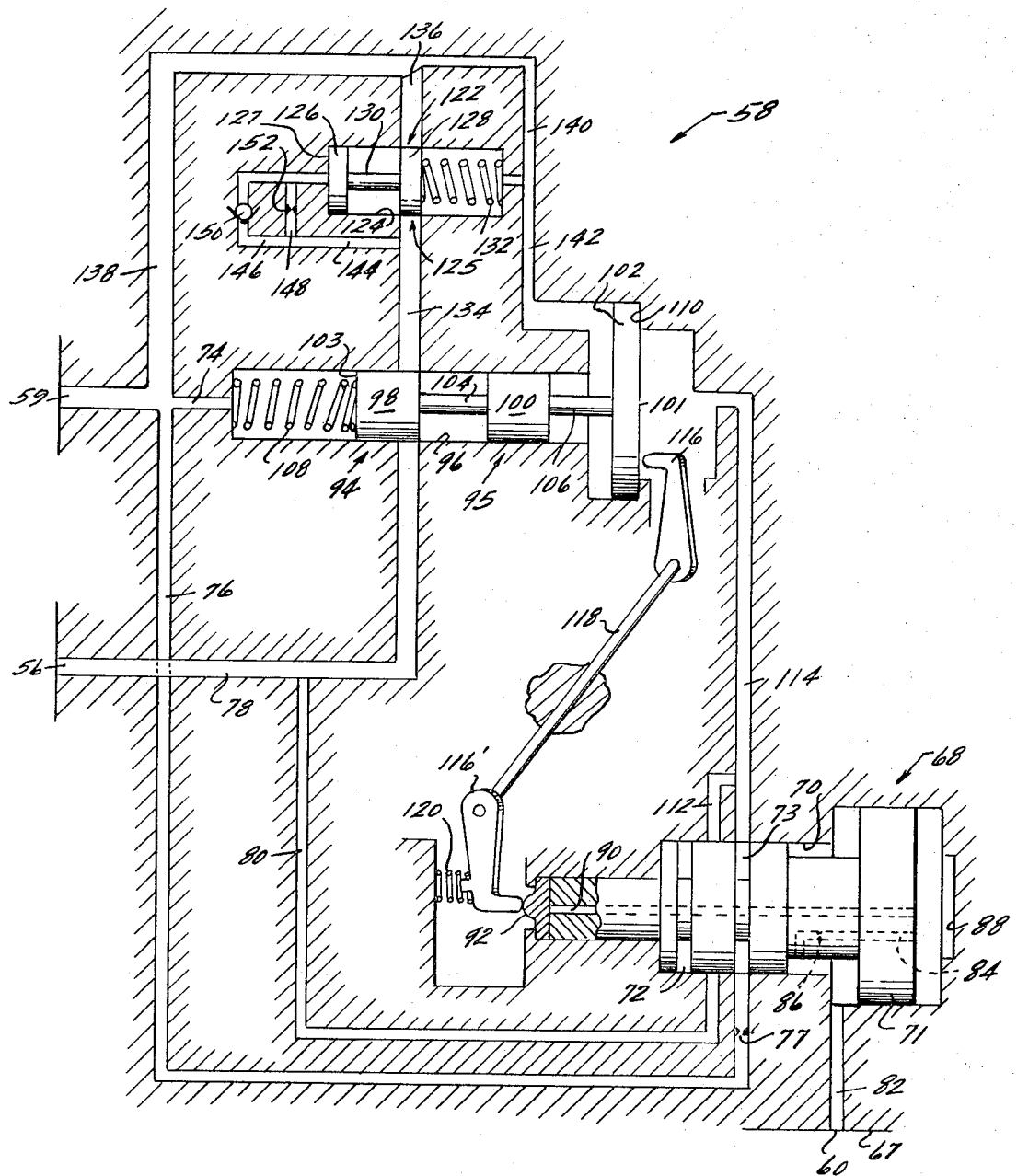

LIGHT-OFF TRANSIENT CONTROL FOR AN AUGMENTED GAS TURBINE ENGINE

BACKGROUND OF THE INVENTION

This invention relates generally to a light-off transient control for an augmented gas turbine engine, and more particularly to a light-off transient control for indirectly regulating the flow of fuel to a gas turbine engine augmentor in a manner facilitating a smooth and uniform increase of engine thrust when the engine power control lever is advanced into the augmentation region of operation.

The invention described and claimed herein resulted from work done under United States Government Contract FA-SS-66-6. The United States Government has an irrevocable, non-exclusive license to practice and have practiced the invention claimed herein, including the unlimited right to sublicense others to practice and have practiced the claimed invention for any purpose whatsoever.

A conventionally augmented gas turbine engine generally has a variable exhaust nozzle, the area of which is varied by a control system as a function of various engine parameters. The augmentor itself generally includes a means, such as a plurality of fuel injectors, containing spray nozzles, for dispersing a flow of fuel together with a flameholder to which the flame may attach. The flow of fuel to the fuel injectors is metered by an augmentor fuel control which is connected to the injectors by feedline conduits together with one or more manifolds.

Conventionally augmented gas turbine engines generally incur a rapid increase of exhaust pressure and temperature resulting in a sudden jump in propulsive thrust upon initial lightoff of the augmentor. This rapid increase in exhaust pressure and temperature occurs before the control system for the variable exhaust nozzle has time to sense the change in engine parameters and react by sufficiently opening the exhaust area. In an augmented turbofan engine, where the level of fan discharge pressure and the operating point of the combined fan and compressor are determined by the augmentation burner pressure, a sudden excessive increase in augmentation burner pressure can operate to back pressure the combined fan and compressor into a stall with the augmentation burner flame eventually blowing out. In an augmented straight turbojet engine, the turbine operates in a choked condition and therefore more effectively isolates the compressor and inlet duct from pressure changes in the augmentor.

Nevertheless, if the jump in thrust in either an augmented turbofan engine or an augmented straight turbojet engine is excessive, there may be such a sudden and rapid acceleration of the aircraft as to have a disturbing effect on the crew and passengers. Augmented gas turbine engines have thus been generally used only to propel military aircraft where rapid acceleration becomes vital to the success of the military mission and the survival of the aircraft. With the advent of supersonic passenger flight, however, there is an increasing demand to utilize augmented gas turbine engines to power commercial supersonic passenger carrying aircraft. Therefore, it has become necessary to minimize the sudden jump in thrust together with the rapid changes in internal engine pressures commonly associated with augmentor light-off.

One solution for minimizing sudden discontinuities in pressure and temperature for conventionally augemented gas turbine engines has involved the use of as many as three or four augmentation burner zones each with its separate set of fuel injectors, manifolds, feedlines, and other attendant complexities. Another approach taken on previous augmentation systems has involved the use of close fitting precision metal-to-metal seals on the pressurizing and closeoff valves of the fuel injectors which operate to keep the feedlines and manifolds filled with fuel during non-augmented operation. Keeping the feedlines and manifolds filled with fuel during the non-augmented period avoids the high initial fuel flow from the augmentation fuel metering control normally required to minimize the time delay during which the feedlines and manifolds are filled. The sudden jump in thrust normally associated with a high initial fuel flow is also minimized. However, contamination and residue deposits often cause the pressurizing and closeoff valves to seat improperly permitting fuel to leak from the injector and coke the spray nozzles during non-augmented operation. Resilient elastomeric seals may be used in the pressurizing valves to correct the leakage problem; however, additional piping is required for seal cooling thereby adding to the system complexity.

Therefore, although it is preferable to drain the manifolds and feedlines during non-augmented operation to prevent the spray nozzles from coking, the high initial fuel flows required to again fill the manifolds and feedlines conflict with the desire to minimize the sudden jump in thrust together with the sudden changes in burner pressure commonly associated with augmentation light-off.

Therefore, it is a primary object of this invention to provide a light-off transient control for an augmented gas turbine engine to indirectly control the rate of fuel flow from the augmentor fuel injector nozzles and thereby reduce the sudden and rapid jump in thrust together with the abrupt changes in augmentor burner pressure commonly associated with augmented gas turbine engines.

It is also an object of this invention to provide a light-off transient control for an augmented gas turbine engine which will allow draining of the feedlines and manifolds during non-augmented operation and at the same time eliminate the time lag which would normally be incurred in filling the system at a reduced flow rate as required for a minimum jump in thrust.

It is also an object of this invention to provide a light-off transient control for an augmented gas turbine engine to receive and bypass a portion of the metered fuel flow from the augmentor fuel control for a limited duration during initiation of augmented operation.

SUMMARY OF THE INVENTION

An augmented gas turbine engine having an augmentor fuel control for metering the rate of fuel flow to a plurality of augmentor fuel injectors is provided with a light-off transient control. The light-off transient control includes a bypassing valve for receiving and bypassing a portion of the metered fuel flow from the augmentor fuel control for a limited time after the gas turbine engine is initially advanced into the augmentation region of operation. Fuel from the bypass valve is subsequently pressurized by a control pressurizing valve. There is also included a control valve which receives a portion of the metered fuel flow from the augmentor fuel control, a portion of the bypass fuel from the pressurizing valve and an initiating signal from the fuel control indicative of when the gas turbine engine is initially advanced into the augmentation region of operation. The control valve operates to first open the bypass valve upon receipt of metered fuel flow from the augmentor fuel control and then gradually close the bypass valve means, thereby indirectly controlling the rate of fuel flow from the augmentor fuel control to the augmentor fuel injectors.

BRIEF DESCRIPTION OF THE DRAWINGS

The invention may be better understood upon reading the following description of the preferred embodiment in conjunction with the accompanying drawings:

FIG. 2 is a cross-sectional view of the light-off transient control of FIG. 1 in one mode of operation.

FIG. 3 is a cross-sectional view of the light-off transient control of FIG. 1 in a mode of operation subsequent to that of FIG. 2.

FIG. 4 is a cross-sectional view of the light-off transient control of FIG. 1 in a mode of operation subsequent to that of FIG. 3.

FIG. 5 is a cross-sectional view of the light-off transient control of FIG. 1 in a mode of operation subsequent to that of FIG. 4.

DESCRIPTION OF THE PREFERRED EMBODIMENT

Figure 1:
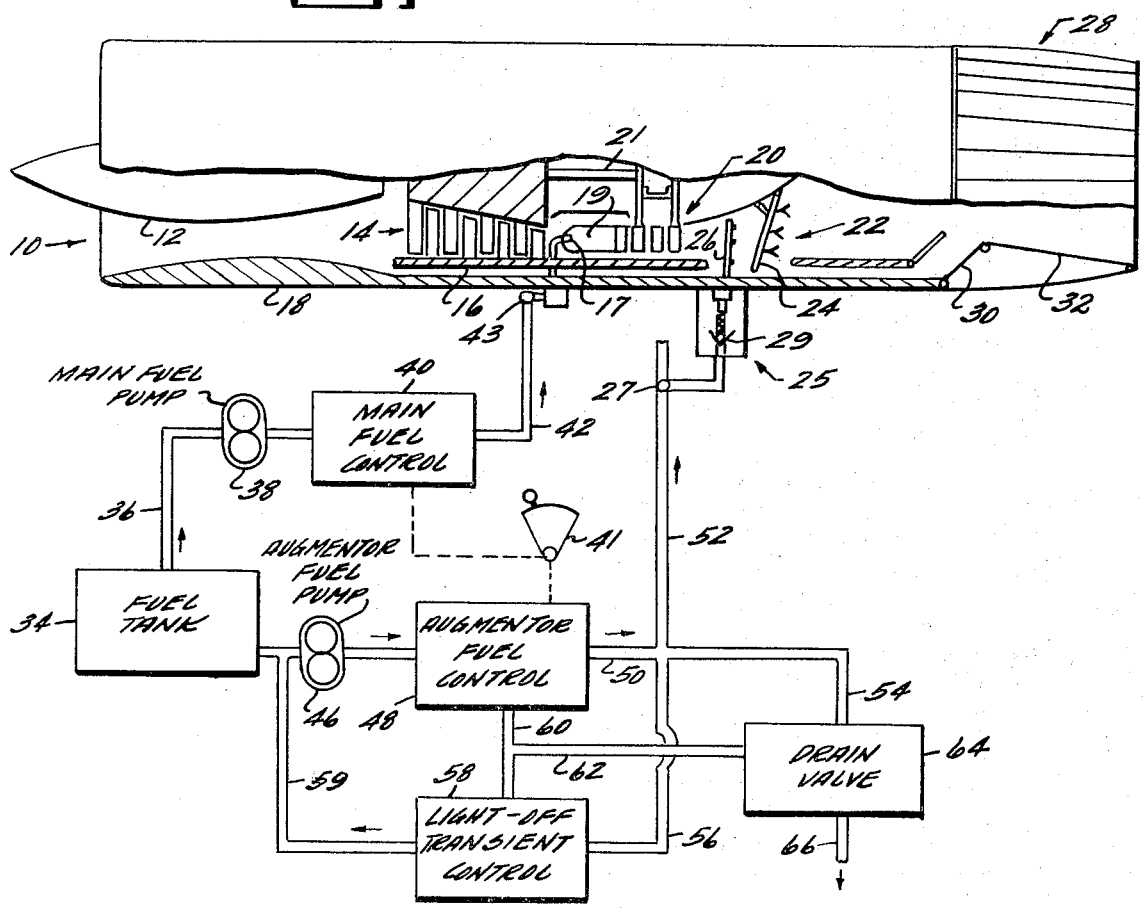
FIG. 1 is a schematic view, partly in cross-section, of an augmented gas turbine engine and associated fuel system embodying the light-off transient control of this invention.

Referring to FIG. 1, there is shown a fuel delivery and control system for use with a supersonic gas turbine engine. The supersonic gas turbine includes an inlet 10 within which is disposed an axisymmetrical spike 12. The inlet 10 may include fixed or variable geometry and may alternatively be of the two dimensional type having a variable ramp and door (not shown). The majority of air is further pressurized by a compressor 14. A small percentage of the air bypasses the compressor as secondary air flowing through the space between the engine compressor casing 16 and an outer casing or nacelle 18. The air pressurized by the compressor 14 supports combustion of fuel in a combustor 19 in the generation of a hot gas stream. Fuel is introduced into the combustor through a series of fuel nozzles 17. A portion of the energy of this hot gas stream drives a turbine 20 which is connected to the rotor of the compressor 14 by a shaft 21. The hot gas stream discharged from the turbine 20 may be augmented by the combustion of additional fuel in an augmentor shown generally at 22. The augmentor 22 includes a flameholder 24 together with a plurality of fuel injectors 25 which receive fuel from a manifold 27. The fuel injectors 25 include a plurality of spray nozzles 26 to which fuel is delivered through a plurality of spring loaded pressurizing check valves 29. The hot gas stream (motive fluid stream) is then discharged through a variable propulsion nozzle 28 which comprises a convergent primary nozzle 30 and a divergent secondary nozzle 32. The gas turbine engine with supersonic capability so far described is conventional and well known to the gas turbine art. While a single rotor turbojet engine has been described, it will be readily appreciated that the light-off transient control of this invention may be broadly applied to other engines having two or more rotors such as an augmented turbofan engine.

Fuel for nozzles 17 is pumped by a main fuel pump 38 from a fuel tank 34 through a conduit 36. The flow of fuel from the main fuel pump 38 to the fuel nozzles 17 through a conduit 42 and a manifold 43 is controlled by a main fuel control 40 primarily as a function of the position of a pilot's power control lever 41. Additional control inputs reflecting selected engine operating parameters such as speed, temperature and pressure are also fed to the fuel control 40 so that the flow of fuel to the engine provides optimum engine performance.

An augmentor fuel pump 46 is further provided in order to furnish pressurized fuel from the fuel tank 34 and the flow of pressurized fuel from the augmentor fuel pump 46 is metered by an augmentor fuel control 48 primarily as a function of the position of the pilot control lever 41. Metered fuel flow from the augmentor fuel control 48 is then directed to the injector nozzles 26 by way of manifold 27 and feedline conduits 50 and 52 respectively which are pressurized by pressurizing check valves 29 in each of the injectors 25. A portion of the fuel flow metered by the augmentor fuel control 48 is diverted to a light-off transient control 58 by means of conduit 56. The light-off transient control 58 bypasses a portion of the output fuel flow from the augmentor fuel control 48, in a manner to be herein described, such that the bypass fuel flow is returned to the inlet of the augmentor fuel pump 46 by way of conduit 59. The light-off transient control 58 is arranged to receive an augmentor initiating signal from the augmentor fuel control 48 by way of conduit 60. There is also provided a drain valve 64 which drains the fuel injector manifold 27 through conduits 54 and 66 when the augmentor fuel supply is shut off by the augmentor fuel control 48. The drain valve 64 is also controlled by an input signal received from the augmentor fuel control 48 through conduits 60 and 62 respectively. While a single manifold system has been described, it will be readily appreciated that systems having two or more injection stages and manifolds could also be used with equal success.

Referring now to FIGS. 2 - 5, there can be seen in greater detail the light-off transient control 58 of this invention. Control 58 is disposed within a housing 67 inside of which there is further contained a control valve 68 having a cylindrical chamber 70. Within the chamber 70 there is translatably disposed a spool 71 having spaced apart circumferential grooves at 72 and 73. The cylindrical chamber 70 receives both a portion of the fuel flow from the augmentor fuel control 48 through conduits 78 and 80 respectively and a portion of the bypass fuel flow through conduit 76 which includes an orifice 77. The initiation signal from the augmentor fuel control 48 is applied through conduits 60 and 82 to cylindrical chamber 70. The grooved spool 71 includes a central passageway 90 extending the longitudinal length thereof which provides flow communication from a plenum 88, defined by one end of the cylindrical chamber 70 to a stop valve 92 translatably disposed at the opposing end of the cylindrical chamber 70. A second passageway 84 having an orifice 86 therein is provided through the spool 71 in order to direct the initiation signal fluid from conduit 82 to plenum 88.

The light-off transient control 58 further includes a bypass valve shown generally at 94 as having a spool 95 translatably disposed within a cylindrical chamber 96. The spool 95 comprises three pistons 98, 100 and 102 maintained in fixed spaced apart relation by interconnecting shafts 104 and 106 which may be formed integral to the pistons. Resilient means such as a spring 108 are provided to urge the spool 95 into abutting engagement with shoulder 110 of the cylindrical chamber 96. The head 101 of piston 102 is pressurized from the control valve 68 by interconnecting conduit 144 and a portion of the bypass fuel from conduit 74 operates in conjunction with spring 108 against the head 103 of piston 98 so as to urge the spool 95 in the direction opposing movement of the pressurized head 101 of piston 102. A portion of the fuel flow from the augmentor fuel control 48 is also directed to the cylindrical chamber 96 by way of conduit 78.

A lever is provided having two sections 116, 116' interconnected by a pivot shaft 118 which is journalled for rotation with respect to the housing 67. One end of lever section 116 may be rotated to engage the head 101 of piston 102 with the opposing end of lever section 116' maintained in potential engaging relation against the stop valve 92 by resilient means such as a spring 120. That portion of the cylindrical chamber 96 intermediate the pistons 100 and 102 is pressurized by a portion of the bypass fuel flow received through conduits 140 and 142 respectively.

The light-off transient control housing 67 further includes a pressurizing valve 122 having a spool 125 translatably disposed within a cylindrical chamber 124. The spool 125 includes two pistons 126 and 128 maintained in fixed spaced apart relation by an integral interconnecting shaft 130. Piston 127 of spool 125 is urged into abutting engagement with the end of cylindrical chamber 124 by the coaction of a resilient means such as spring 132, together with the bypass fuel flow received through conduit 140. That portion of the fuel flow from the augmentor fuel control 48 which is bypassed by the bypass valve 94 is received by the pressurizing valve 122 through interconnecting conduit 134. The fuel flow from conduit 134 also communicates with the head 127 of piston 126 through parallel conduits 146 and 148 which respectively include a check valve 150 and an orifice 152. Pressurized bypass fuel subsequently exits from the valve 122 through conduits 136 and 138 respectively.

During engine operation, when the actual engine speed exceeds some predetermined percentage of the maximum engine speed, and when the pilot control lever 41 is advanced into the augmentor range, fuel from the augmentor fuel control 48 begins to fill conduits 50, 52, 54, 56 and manifold 27, and the servo fluid pressure of the augmentation initiation signal through conduit 60 is increased to a regulated servo pressure. Referring now to FIG. 2, there is shown the position of the light-off transient control at the instant the pilot control lever 41 is initially advanced into the augmentor range. A portion of the metered fuel from the augmentor fuel control 48 enters the light-off transient control 58 from conduit 56 whereupon the fuel fills conduits 78 and 80 within the housing 67. The circumferential groove 72 of spool 71 directs the metered fuel through conduits 112 and 114 respectively to the cylindrical chamber 96 of the bypass valve 94. Metered fuel entering the cylindrical chamber 96 pressurizes the head 101 of piston 102 so as to translate the spool 95 in the direction of spring 108 compression. Translation of piston 98 against the spring 108 in turn operates to open the bypass valve 94, as shown in FIG. 3, permitting the flow of metered fuel from conduit 78 between pistons 98 and 100 and through the bypass valve to conduit 134. The portion of metered fuel bypassed in this manner than fills conduits 144, 146 and 148, and operates against the head 127 of piston 126 to translate spool 125 in the direction of spring 132 compression. The pressurizing valve 122 cracks open with the translation of piston 128 against spring 132, permitting the flow of pressurized bypass fuel from conduit 134 through the pressurizing valve to conduit 136, whereupon the bypass fuel is directed outward of the light-off transient control through conduit 138.

Referring now to FIG. 3, there can be seen the light-off transient control with the bypass valve 94 fully open. When spool 95 translates in the direction of spring 108 compression to open the bypass valve 94, lever sections 116, 116' rotate in a counter clockwise direction about pivot shaft 118 so as to engage and translate the stop valve 92 against the end of spool 71 and block the flow of initiation signal servo fluid through passageway 90. As is readily apparent, lever sections 116, 116' are rotated in a counter clockwise direction by the expansion of spring 120. With the blockage of flow through passageway 90, the pressure of the initiation signal servo fluid within plenum 88 starts to increase toward the regulated servo pressure at a rate controlled by the orifice 86. The increased pressure within plenum 88 then operates to translate the spool 71 against the end of lever sections 116, 116' so as to compress spring 120 and rotate lever sections 116, 116' in a clockwise direction about pivot shaft 118.

Referring now to FIG. 4, there is shown the control valve 68 with spool 71 fully translated against the opposing end of cylindrical chamber 70 and with lever sections 116, 116' fully rotated in a clockwise direction about pivot shaft 118. As is now readily apparent, the flow of metered fuel from the augmentor fuel control 48 through conduits 78 and 80 is blocked by translation of spool 71. Metered fuel within cylindrical chamber 96 and conduit 114 which operated against the head 101 of piston 102 to maintain the bypass valve open, may now vent through groove 73 of the control valve 68 to the lower pressure bypass fuel in conduit 76. This permits the bypass valve 94 to close at a rate which is controlled by the resilient force of spring 108, the pressure of the bypass fuel, the size of orifice 77, and the areas of the piston heads 103 and 101 of pistons 98 and 102 respectively. The pressurizing valve 122 subsequently closes at a slower rate which is generally a function of the bypass fuel pressure, the resilient force of spring 132, the size of orifice 152, and the areas of the piston heads of pistons 126 and 128.

Referring now to FIG. 5, there is shown the light-off transient control 58 with the bypass valve 94 and the pressurizing valve 122 returned to their closed positions. It will be noted that full clockwise rotation of lever sections 116, 116' about pivot shaft 118 as precipitated by translation of spool 71 within cylindrical chamber 70 against spring 120 operates to remove the end of lever section 116 from engagement with piston 102 even after the bypass valve 94 is closed. The bypass valve 94 will therefore remain in this closed position. The pressure of the initiation signal servo fluid is reduced when the pilot control lever 41 is retarded below the augmentor operating range. When the pilot control lever 41 is retarded below the augmentor operating range, the augmentor fuel control reduces the servo fluid pressure of the initiation signal through conduits 60 and 82, thereby reducing the pressure of the servo fluid within plenum 88. The reduced pressure within plenum 88 then permits the expansion of spring 120 which returns lever sections 116, 116' to their original positions, shown in FIG. 2.

Figure 6:
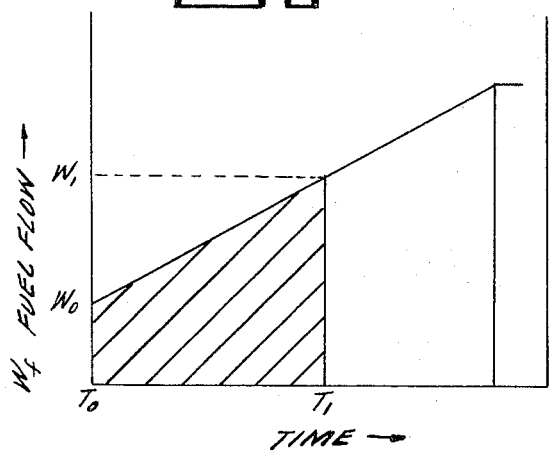
FIG. 6 is a graphical representation of rate of augmentor fuel flow versus time for a conventionally augmented gas turbine engine.

As previously discussed, conventionally augmented gas turbine engines incur a sudden and rapid increase in augmentation burner pressure and a sudden jump in thrust upon initial light-off of the augmentor. This is due to a combination of interrelated factors such as the time required for augmentation fuel to fill the feedline conduits and manifold to the augmentor fuel injectors and the generally high rate of increase of fuel flow from the augmentor fuel injectors into the burner during the augmentor light-off. By now comparing the graphs of FIGS. 6 and 7, it can be better appreciated how the light-off transient control of this invention substantially reduces the sudden and rapid transients normally incurred in conventionally augmented gas turbine engines. Referring first to FIG. 6, there is shown a graphical representation for a conventionally augmented gas turbine engine wherein the ordinate represents fuel flow rate $W_f$ and the abscissa represents time, starting at $T_o$ for the instant the pilot control lever is advanced into the augmentation region and fuel begins to flow from the augmentor fuel control. An initial fuel flow rate $W_o$ exists at $T_o$ and reflects the minimum schedule of fuel flow from the augmentor fuel control. The time lag between the initial flow of fuel from the augmentor fuel control and the instant of initial fuel flow from the augmentor fuel injectors is $T_1$ wherein the area of the graph shaded by parallel lines represents the total amount of fuel required to fill the supply conduits and manifold between the augmentor fuel control and the augmentor fuel injectors. It can now be appreciated that fuel initially emanates from the augmentor fuel injectors suddenly at a relatively high flow rate, $W_1$, which when ignited causes a sudden increase in burner pressure accompanied by a burst of thrust which rapidly accelerates the aircraft. In an augmented turbofan engine the sudden increase in burner pressure could drive the combined fan and compressor into a stall.

Figure 7:
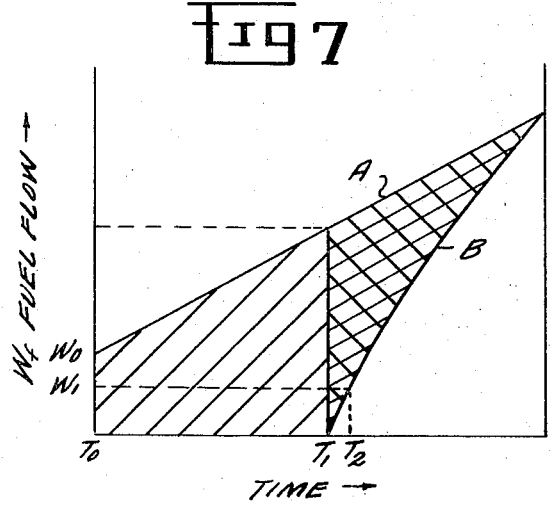
FIG. 7 is a graphical representation of rate of augmentor fuel flow versus time for augmented gas turbine engine of FIG. 1.

By contrast, FIG. 7 shows a graphical representation of an augmented gas turbine engine utilizing this invention wherein the ordinate again represents fuel flow rate, $W_f$, and the abscissa represents time starting at $T_o$ for the instant the pilot control lever is advanced into the augmentation region and fuel begins to flow from the augmentor fuel control. Curve A is a plot of the rate of fuel flow from the augmentor fuel control with $W_o$ again referencing the minimum schedule of fuel flow from the augmentor fuel control. The fuel supply conduits and manifold between the augmentor fuel control and augmentor fuel injectors again fill at $T_1$ with the area shaded by parallel lines representing the total amount of fuel required to fill the supply conduits and manifolds. At the time the fuel supply conduits are filling, however, the light-off and transient control is also opening to bypass a substantial portion of the fuel from the augmentor fuel control so that the rate of fuel flow from the augmentor fuel injectors into the burner follows curve B with the area shaded by cross-hatching representing the amount of fuel bypassed by the light-off transient control. The portion of fuel initially bypassed by the light-off transient control may incur a time delay up to $T_2$ before the cracking pressure of pressurizing check valve 29 is again reached at which point fuel readily flows from the augmentor fuel injectors. It will be appreciated that the initial flow of fuel through the augmentor fuel injectors at ignition is substantially less for the augmentor arrangement of this invention than for conventionally augmented engines. The low initial rate of fuel flow from the augmentor fuel injectors together with the gradual increase in fuel flow along curve B, provides for a controlled and substantially more uniform rate of increase in burner pressure and thrust eliminating the pressure surge and thrust jump commonly associated with conventional afterburning engines.

Thus having described a preferred embodiment of the invention, though not exhaustive of all possible equivalents, what is desired to be secured by letters patent is claimed below.

What is claimed is:

1. In an augmented gas turbine engine of the type having an augmentor fuel control for metering the rate of fuel flow to augmentor fuel injectors, there is provided a light-off transient control comprising:

bypassing valve means for receiving and bypassing a portion of the metered fuel flow from the augmentor fuel control for a limited time after the gas turbine engine is initially advanced into the augmentation region of operation, pressurizing valve means for receiving and pressurizing the bypassed fuel flow from the bypassing valve means; and control valve means for receiving a portion of the metered fuel flow from the augmentor fuel control, a portion of the bypass fuel from the pressurizing valve means, and an initiation signal from the fuel control indicative of when the gas turbine engine is initially advanced into the augmentation region of operation, wherein the control valve operates to first open the bypass valve means upon an increase of metered fuel flow pressure and then gradually close the bypass valve means, thereby indirectly controlling the rate of increase of fuel flow from the augmentor fuel injectors into the augmentor.

2. The light-off transient control of claim 1 wherein the control valve means includes:

a cylindrical chamber, a circumferentially grooved spool translatably disposed within the cylindrical chamber wherein the grooves operate to transmit either a portion of the metered fuel flow from the augmentor fuel control or a portion of the bypass fuel from the pressurizing valve means depending upon spool location within the cylindrical chamber and further including a central passageway extending the longitudinal length of the spool and a second passageway for communicating the initiation signal to pressurize one end of the spool, and a stop valve means translatably disposed within the cylindrical chamber in spaced relation to the other end of the spool such that translation of the stop valve operates to block flow through the central passageway of the spool.

3. The light-off transient control of claim 2 wherein the bypass valve means includes:
  a second cylindrical chamber,
  a second spool having a plurality of spaced apart pistons translatably disposed within the second cylindrical chamber wherein the piston head at one end of the second spool is pressurized by fuel transmitted from the control valve means and the piston head at the opposite end of the second spool is pressurized in the opposing direction by a portion of the bypass fuel from the pressurizing valve means such that translation of the second spool operates to control the amount of metered fuel flow from the augmentor fuel control which is bypassed by the bypass valve means,
  resilient means for urging the second spool in the same direction of translation as it is urged by the bypass fuel; and further including
  lever means maintained in fixed rotatable relation relative to the control valve means and bypass valve means with one end of the lever in potential engaging relation relative to that piston head pressurized by fuel transmitted from the control valve means and with the other end of the lever resiliently urged into potential engaging relation relative to the translatable stop valve.

4. The light-off transient control of claim 3 wherein the pressurizing valve means includes:
  a third cylindrical chamber,
  a third spool having a plurality of spaced apart pistons translatably disposed within the third cylindrical chamber wherein the piston head at one end of the third spool is pressurized by fuel received from the bypass valve means and the piston head at the opposite end of the third spool is pressurized in the opposing direction by a portion of the bypass fuel which emanates from the pressurizing valve means as a function of translation of the third spool; and
  resilient means for urging the third spool in the same direction of translation as it is urged by the bypass fuel from the pressurizing valve.

5. A light-off transient control for regulating the flow of fuel from an augmentor fuel control to a plurality of fuel injectors comprises:
  a bypassing valve arranged in flow communication to receive and temporarily bypass a portion of the fuel flow from the augmentor fuel control,
  a pressurizing valve arranged in flow communication to receive and pressurize the bypassed fuel flow from the bypassing valve; and
  a control valve arranged in flow communication to receive a portion of the fuel flow from the augmentor fuel control, a portion of the bypass fuel from the pressurizing valve means and an input signal fluid from the fuel control wherein the control valve operates to first open the bypass valve upon receipt of the signal fluid from the augmentor fuel control and then close the bypass valve at a gradual predetermined rate in order to indirectly control the rate of increase of fuel flow from the augmentor fuel injectors into the augmentor.

6. The light-off transient control of claim 5 wherein:
  the control valve includes: a cylindrical chamber, a spool translatably disposed within the cylindrical chamber having a central passageway extending the longitudinal length thereof and a second passageway for communicating the initiation signal to pressurize one end of the spool wherein translation of the spool operates to switch outlet fuel flow from the control valve between inlet fuel flow from the augmentor fuel control and inlet bypass fuel flow from the pressurizing valve, and a stop valve translatably disposed in spaced relation to that end of the spool opposing the second passageway outlet wherein translation of the stop valve operates to block flow through the central passageway of the spool;
  the bypass valve includes: a second cylindrical chamber, a second spool translatably disposed within the second cylindrical chamber wherein one end of the spool is pressurized by fuel transmitted from the control valve and the opposite end of the spool is pressurized in the opposing direction by a portion of the bypass fuel from the pressurizing valve such that translation of the spool operates to control the amount of fuel flow from the augmentor fuel control which is bypassed by the bypass valve, and resilient means for urging the second spool in the same direction of translation as it is urged by the bypass fuel; and
  there is further included a rotatably journalled lever, one end of which may be rotated into engaging relation with the second spool with the other end resiliently urged toward engaging relation with the stop valve wherein the portion of fuel flow initially received from the augmentor fuel control is transmitted to the bypass valve through the control valve and operates to translate the second spool to open the bypass valve permitting limited rotation of the lever which then engages and translates the stop valve to block the central passageway through the first spool, and increase the pressure on one side of the first spool translating the first spool and switching the fuel pressure to the bypass valve to bypass fuel pressure in order to allow the bypass valve to gradually close.

7. The light-off transient control of claim 6 wherein the pressurizing valve includes:
  a third cylindrical chamber,
  a third spool pressurized at one end by fuel received from the bypass valve and pressurized at the opposing end by a portion of the bypass fuel which emanates from the pressurizing valve as a function of translation of the third spool; and
  resilient means for urging the third spool in the same direction of translation as it is urged by the bypass fuel from the pressurizing valve.

8. The light-off transient control of claim 6 including a conduit for directing a portion of the bypass fuel to the control valve wherein the conduit includes an orifice therein, the size of which influences the rate at which the bypass valve closes and wherein the second passageway also includes an orifice the size of which influences the rate at which the control valve spool translates.

* * * * *